United States Patent [19]

Mutsers et al.

[11] Patent Number: 4,701,353

[45] Date of Patent: Oct. 20, 1987

[54] PROCESS FOR THE PREPARATION OF GRANULES

[75] Inventors: Stanislaus M. P. Mutsers, Geleen; Gerardus S. P. M. Craenen, Susteren, both of Netherlands

[73] Assignee: Unie van Kunstmestfabrieken B.V., Utrecht, Netherlands

[21] Appl. No.: 643,024

[22] Filed: Aug. 21, 1984

[30] Foreign Application Priority Data

Aug. 27, 1983 [NL] Netherlands ............... 8303000

[51] Int. Cl.⁴ .................................. B05D 1/02
[52] U.S. Cl. ................................. 427/213; 71/64.06; 239/9; 239/400; 239/403; 239/424; 159/4.06; 159/43.1; 159/47.2; 159/48.1; 159/DIG. 3; 159/DIG. 21; 159/DIG. 38; 261/78.1
[58] Field of Search ............ 159/4.06, 43.1, 45, 159/47.2, 48.1, 47.1, DIG. 3, DIG. 21, DIG. 38; 71/64.06; 260/707; 427/213; 261/78 A; 239/8, 9, 400, 403, 419.3, 424, 427.5, 428

[56] References Cited

U.S. PATENT DOCUMENTS

| | | | |
|---|---|---|---|
| 3,662,960 | 5/1972 | Mitchell et al. | 239/400 |
| 3,831,843 | 8/1974 | Masai | 239/8 |
| 3,979,069 | 9/1976 | Garofalo | 239/400 |
| 4,217,127 | 8/1980 | Kono et al. | 427/213 |
| 4,219,589 | 8/1980 | Niks et al. | 159/47.2 |
| 4,221,339 | 9/1980 | Yoshikawa | 239/403 |
| 4,456,181 | 6/1984 | Burnham | 239/403 |

FOREIGN PATENT DOCUMENTS 2075908 11/1981 United Kingdom .

Primary Examiner—S. Leon Bashore
Assistant Examiner—Andrew J. Anderson
Attorney, Agent, or Firm—Cushman, Darby & Cushman

[57] ABSTRACT

Preparation of granules by making nuclei grow, in a fluidized bed, by causing a liquid material to solidify thereon. The liquid material is sprayed in the bed upwards, with the aid of a spraying device provided with a central channel through which the liquid material is supplied, and a channel concentric therewith carrying a powerful gas stream, with the liquid material contacting the gas stream and being carried with the gas stream to a dilute zone where the growth of the nuclei takes place, which zone is created by the gas stream and is completely within the fluidized bed. The liquid material is made to come out of the central channel as a virtually closed, conical film, with a thrust exceeding the thrust of the gas stream, and this film is nebulized to very fine droplets with the aid of the gas stream.

In this process a very small amount of high-energetic gas is needed, while no agglomeration occurs in the bed.

7 Claims, 5 Drawing Figures

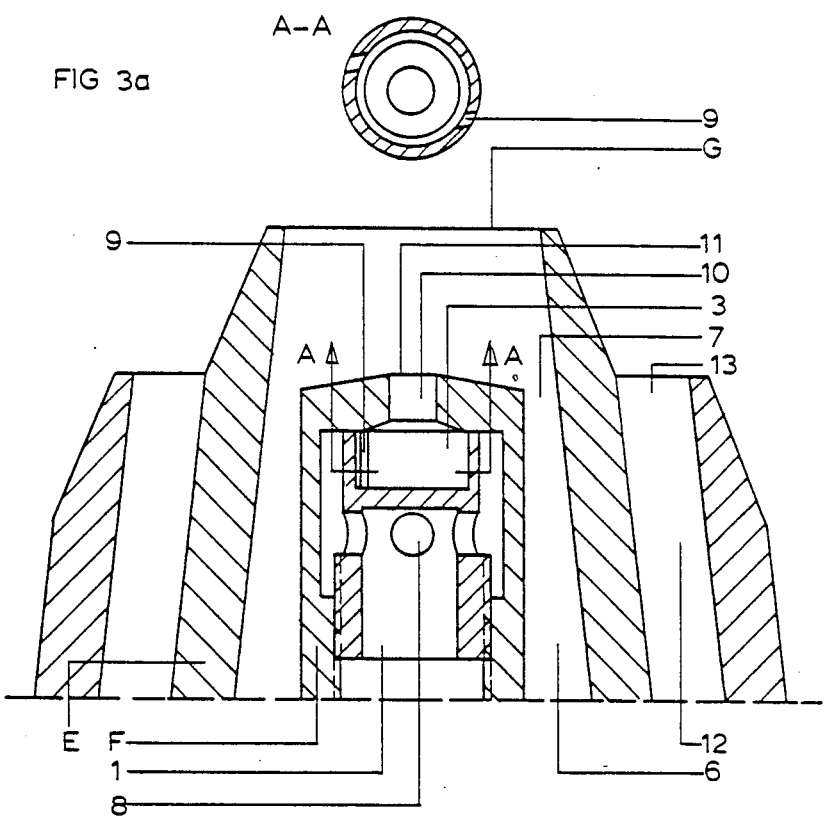

PROCESS FOR THE PREPARATION OF GRANULES

BACKGROUND OF THE INVENTION

The invention relates to a process for the preparation of granules by spraying a liquid material in a fluidized bed of solid nuclei, upon which the nuclei grow by solidification of the liquid material on them, and removing the granules thus formed from the fluidized bed.

A similar process is known from The Soviet Chemical Industry 4 (1972) No. 7, pp. 456-458, and 5 (1973), No. 4, pp. 265-267, and from Verfahrenstechnik 9 (1975) No. 2, pp. 59-64.

In these known processes, the liquid material, for example in the form of a solution, melt or suspension, is with the aid of a gas sprayed to droplets, which on the fluidized nuclei solidify to form granules of the desired size. In order for the granulation process to proceed well, it is necessary that the surface of the grown nuclei solidifies sufficiently quickly and that any water present evaporates quickly, to prevent agglomeration of individual particles. In the known processes this is achieved by spraying the liquid material to fine droplets, or even nebulizing it. Of course, the rule here is that the more water is to be evaporated, the finer the nebulization should be. The size of the droplets obtained in spraying is mainly determined by the pressure and the quantity of the spraying gas, the general rule being that as this pressure and quantity are higher, the drops obtained are smaller. It is therefore common practice to apply a fairly high feed pressure, for example 1.5 bar or more as described in, inter alia, Khim. Naft. Mashinostr. (1970) No. 9, pp. 41-42, and in U.S. Pat. No. 4,219,589, to obtain droplets of relatively small average diameter.

A disadvantage of these known processes is that for spraying the liquid material to droplets a large amount of gas of high pressure is required, which, of course, is accompanied by a high energy consumption. A possible explanation for this is that the liquid material contacts the gas as a jet. The jet is broken up into drops by the gas stream pealing the outer layers from the jet.

This process continues along some distance in the downstream direction. In this process, the gas is necessarily slowed down, resulting in progressively poorer nebulization. In order still to achieve a sufficiently fine nebulization, therefore, a high mass ratio of highenergetic gas to liquid material must be applied. It has been found that for sufficiently fine nebulization of any liquid material this ratio should generally be higher than 1. Admittedly, it is possible to conduct this known spraying method with a lower mass ratio of gas to liquid material, but then a gas stream of very high feed pressure must be applied, for example more than 4 bar. The disadvantage of this is that it is accompanied by an even higher energy consumption.

In principle, fine nebulization can be achieved also by hydraulically spraying the liquid material, at very high liquid feed pressure (tens of bars). The energy consumption is then lower than in the previously described processes, but this method has the disadvantage of extreme wear on the spraying device. Moreover, serious agglomeration of nuclei in the fluidized bed is found to occur with this spraying method.

According to another known process, which is described in, for example, GB Nos. A 2,019,302 and 2,075,908, in a fluidized-bed granulation process the liquid material is with the aid of a hydraulic sprayer divided into relatively large drops, which are subsequently finely nebulized with the aid of a powerful gas stream. To this end, the liquid material is sprayed upward in the fluidized bed of nuclei via a sprayer provided with two concentric channels, the liquid material being supplied through the inner channel and the drops being contacted, shortly after leaving this channel, with a powerful gas stream supplied through the outer channel. By the powerful gas stream above the sprayer, a zone is created in the fluidized bed with a very low concentration of nuclei, the so-called dilute zone, into which nuclei are aspirated from the fluidized bed to be moistened with droplets of liquid material. Although in this known process the required amount of high-energetic gas is lower than in the processes mentioned in the introduction, this amount is found to be still quite substantial. It has been found that for good nebulization of all liquid material the required mass quantity of high-energetic gas must be more than 50% of the mass quantity of liquid material.

SUMMARY OF THE INVENTION

The present invention provides a process whereby granules can be prepared from a liquid composition via a fluidized-bed granulation, in which process a very small amount of high-energetic gas is needed and there is little or no agglomeration of particles in the fluidized bed.

The invention, therefore, relates to a process for the preparation of granules which process comprises making solid nuclei grow, in a bed kept fluidized by a gas flowing upwards through the bed, by causing a liquid material to solidify on said nuclei, the liquid material being sprayed in the fluidized bed of nuclei from the bottom upwards, with the aid of at least one spraying device provided with a central channel through which the liquid material is supplied, and a channel concentric therewith carrying a powerful gas stream with a linear upward velocity higher than that of the fluidization gas, making the liquid material to come out of the central channel as a virtually closed, conical film, with a thrust exceeding the thrust of the powerful gas stream, nebulizing this film with the aid of the powerful gas stream to very fine drops which are carried with the gas stream to a dilute zone where the growth of the nuclei takes place, which zone is created by the gas stream and is completely within the fluidized bed and above the spraying device, and removing the granules thus obtained from the bed.

DETAILED DESCRIPTION OF THE PREFERRED EMBODIMENTS

The liquid material is sprayed with the aid of a spraying device provided with a central channel through which the liquid material is supplied and a concentric channel provided around it through which a powerful gas stream, in particular air, is supplied. This powerful gas stream hits the liquid material coming out of the central channel, whereby the liquid material is converted to drops that are carried along with the gas stream. In addition, the powerful gas stream creates a zone above the sprayer in the bed where the concentration of nuclei is considerably lower than in the rest of the bed. Nuclei are sucked into this dilute zone from the surrounding bed and are in the dilute zone covered with droplets of liquid material, which solidifies on the surface as the particles rise in the dilute zone. The velocity of the gas stream gradually decreases with increasing height, and the height of the bed is so chosen that local disturbances of the bed surface are prevented.

An essential part of the present invention is the manner in which the liquid material comes out of the central channel, that is, as a virtually closed conical film. Relative to the known processes discussed in the introduction, where the liquid material is as a jet or as drops hit by the gas stream, this has the advantage that a considerably smaller amount of high-energetic gas suffices. This is because the total amount of gas is utilised for nebulizing, and, moreover, the gas hits the liquid film in such a way that nebulizing occurs instantaneously, while the gas still has substantially its initial velocity.

A closed conical film can, in principle, be obtained in various ways.

For example, the liquid material can with the aid of a tapered part at the end of the outlet channel be converted to a film. Advantageously, the conical film is obtained by giving the liquid material a rotation. Of course, besides the rotational speed given to the liquid material, also the hydrostatic pressure on the liquid material is important. In general, the liquid material is supplied under a hydrostatic pressure of 2 to 11 bar, in particular 4 to 8 bar. Particularly, a sprayer provided with a rotation chamber is used. In this arrangement, the liquid is under hydrostatic pressure pressed through one or more channels leading into the rotation chamber tangentially. The material thus brought into rotation is subsequently let out through an outlet channel which, in general, has a smaller diameter than the rotation chamber. The material, which as a liquid film moves along the wall of the outlet channel, has a horizontal velocity component there resulting from the rotation, and a vertical velocity component depending on throughout. The vertex angle of the cone-shaped film formed after exit from the outlet channel is determined by the ratio of these two velocity components. This vertex angle is in general 50°-110°, in particular 80°-100°. A smaller vertex angle is less desirable, since in that case it would become difficult, if not impossible, to achieve a sufficiently wide angle of impact with the powerful gas stream. On the other hand, a wider vertex angle is constructionally more complicated and offers little or no advantage for nebulizing.

According to the invention, the film exiting in this way is hit by the powerful gas stream at an angle of, for example, 30°-80°. A smaller angle of impact is undesirable, as mixing and nebulizing are then considerably poorer. On the other hand, a wider angle of impact is almost impossible to realize in practice.

Particularly, the angle of impact is set to 40°-70°. This angle of impact is of course determined by the above-mentioned vertex angle of the outcoming film and the angle at which the powerful gas stream possibly converges at the outlet opening. In principle, in the process of the invention a non-converging gas stream can be applied, but advantageously this stream is made to converge at a small angle, e.g. 5°-25°, and particularly 5°-15°. A smaller angle of convergence is less desirable because then the angle of impact becomes too small. On the other hand, for obtaining an angle of convergence exceeding 25° an extremely large amount of energy is required.

Adequate nebulizing in part depends on the velocity of the powerful gas stream. It appears that with a low gas velocity a sufficiently fine nebulization can never be obtained. It has been found that the smallest average drop diameter that can be obtained depends on the relation between the density of the gas, the potential velocity of the gas and the surface tension of the liquid material. It has been found that the ratio:

$$\rho_{gas} U^2_{gas} / \sigma_1$$

where:

$\rho_{gas}$ = the density of the gas, in kg/m$^3$,
$U_{gas}$ = the potential velocity of the gas, in m/sec., and
$\sigma_1$ = the surface tension of the liquid material, in N/m, should be at least $10^5$ m$^{-1}$ to achieve a sufficiently fine nebulization, in particular $5 \times 10^5$ to $50 \times 10^5$ m$^{-1}$.

It has been found that, to this end, the gas velocity should generally be 200 to 350 m/sec, and in particular 250-300 m/sec.

In principle, a gas with a lower velocity may suffice, if a surface-tension reducing agent is added to the liquid.

The required size of this powerful gas stream is small in the present process. Generally, a mass ratio of powerful gas stream to liquid material of between 0.25:1 and 0.45:1 is used. The temperature of the powerful gas stream is generally chosen equal to or slightly higher than the temperature of the liquid material to be granulated.

As mentioned above, the said powerful gas stream not only serves for fine nebulizing of the liquid material but also for creating a dilute zone above the spraying device, for aspiration of nuclei from the bed to this dilute zone, and for carrying the particles upward in this dilute zone. Although all these functions can be performed by one powerful gas stream, it has been found that for the transportation of the nuclei in principle a gas can be used which has a lower velocity than necessary for nebulizing. The velocity of such a gas should be higher, though, than the free-fall velocity of the particles aspirated. A gas with a velocity of 50-150 m/sec., in particular about 100-125 m/sec., has been found to be sufficient for this.

According to one mode of realisation of the present invention, therefore, a portion of the high-energetic gas is replaced by a gas with a lower velocity. This can be realised by providing the spraying device with three concentric channels, with the inner channel carrying the liquid material, the intermediate one a high-energetic gas stream (for example with a velocity $\geqq$ 200 m/sec.) and the outer one a less energy-rich gas stream (for example 100 m/sec.).

Another essential part of the present invention is that the thrust of the liquid material exceeds the thrust of the gas. Thrust is here defined as $\rho V^2$, where $\rho$ is the density, in kg/m$^3$, and V the outlet velocity, in m/sec. The thrust requirement derives from the fact that for good mixing and nebulizing it is necessary that at the place of impact the film moves straight ahead, i.e. into the gas stream, so that the gas energy is optimally utilized.

Generally, $$\rho_1 V_1^2 / \rho_{gas} V^2_{gas}$$

is chosen to be greater than 5, in particular 8 to 16.

With the present invention it is important that the film surface displays a certain roughness or rippling. This is achieved by turbulences in the liquid material caused by, among other things, the finish of the spraying device. To this end, the outlet channel of the spraying device can be provided with a roughened wall, for example. In addition, turbulence is determined by the liquid velocity of the film. It has been found that for sufficient internal turbulence the dimensionless Weber number (Weδ), expressed as:

$$We\delta = \rho_1 U_1^2 \delta / \sigma_1$$

should be greater than 2000, in particular greater than 3000, where:
 $\rho_1$ = the density of the liquid material, in kg/m³,
 $U_1$ = the potential velocity of the liquid material, in m/sec.,
 $\sigma_1$ = the surface tension of the liquid material, in N/m, and
 $\delta$ = the film thickness upon exit from the central channel, in m.

It has been found that, to this end, the liquid velocity should in general be greater than 20 m/sec. Advantageously, a liquid velocity of 20-50 m/sec. is used, in particular 25-40 m/sec.

Besides the above-mentioned roughness of the wall of the spraying device and the liquid velocity, the film geometry is of importance for the required nebulization. Fine nebulizing is promoted by small film thickness. As the film thickness is greatest upon exit from the spraying device and then gradually decreases, it is desirable to make the gas jet hit the film at some distance from the outlet opening. This has the additional advantages that the film, which at first has a relatively smooth surface, becomes rougher further downstream owing to internal liquid turbulence. On the other hand, the gas stream should not come into contact with the liquid material at too large a distance from the outlet opening, since the film falls apart after a certain distance.

The present process can be used for the granulation of all kinds of liquid materials, whether in the form of a solution, melt or suspension. The process is particularly suitable for the granulation of water-containing liquid materials, where besides solidification quick evaporation of water should take place. Examples of materials granulatable with the present process are ammonium salts, such as ammonium nitrate, ammonium sulphate, or ammonium phosphate and mixtures thereof, single fertilizers such as calcium ammonium nitrate, magnesium ammonium nitrate, compound NP and NPK fertilizers, urea and urea-containing compounds, sulphur, organic substances such as bisphenol and caprolactam, and the like.

In addition, the process is suitable for applying liquid material to nuclei of a composition which differs from that of the liquid material, such as the coating of fertilizers or urea particles with, for example, sulphur.

In the process according to the invention, the temperature of the liquid material to be granulated may vary within wide limits. In principle, this temperature should be chosen as near to the solidification point of the material as possible, to achieve quick solidification upon spraying.

On the other hand, a certain temperature difference relative to this solidification temperature is desirable, to prevent accretion of crystallizing material around the outlet opening of the feeding device. In general, a liquid material with a temperature about 5°-15° C. above the solidification temperature is used.

As nuclei in the fluidized bed, in principle all kind of pellets can be used, for example prills separately prepared from a portion of the liquid material to be sprayed, or from a melt obtained by melting of the oversize fraction obtained after screening of the granulate. In particular, as nuclei granules are used which have been obtained during screening and/or crushing of the granulate obtained from the bed. The average diameter of these nuclei may vary, partly depending on the nature of the material to be granulated and especially on the desired particle size of the product. In general, nuclei will be used with a minimum average diameter of 0.75 mm. The quantity of nuclei introduced may vary. In general, such an amount of particles is introduced that the weight ratio of the particles introduced to the liquid material introduced is between 1:1 and 1:2.

The bed of nuclei is kept in a fluidized state by an upwardflowing gas, in particular air. This fluidization gas should have a minimum superficial velocity to ensure that the bed is completely kept in a fluidized state. On the other hand, this velocity should not be excessively high, in connection with energy costs and to prevent dust emission. In general with an average particle size of the final product of 2-4 mm a fluidization gas with a superficial velocity of 1.5-2.5 m/sec., in particular 1.7-2.2 m/sec. is used.

The temperature of the fluidization gas depends on, among other things, the desired bed temperature, which, as usual, is set by a convenient choice of the temperature of the material to be sprayed, the spraying gas, the nuclei supplied and the fluidization gas. The height of the bed can be chosen within wide limits, for example 50 to 150 cm.

The invention will be explained in detail with reference to the accompanying drawings.

FIG. 3 represents a longitudinal section of the outlet part of a spraying device which has been provided with two concentrically applied gas channels. FIG. 3A represents schematically, a cross section of the rotation chamber in such a sprayer, viewed from the top.

Figure 1:
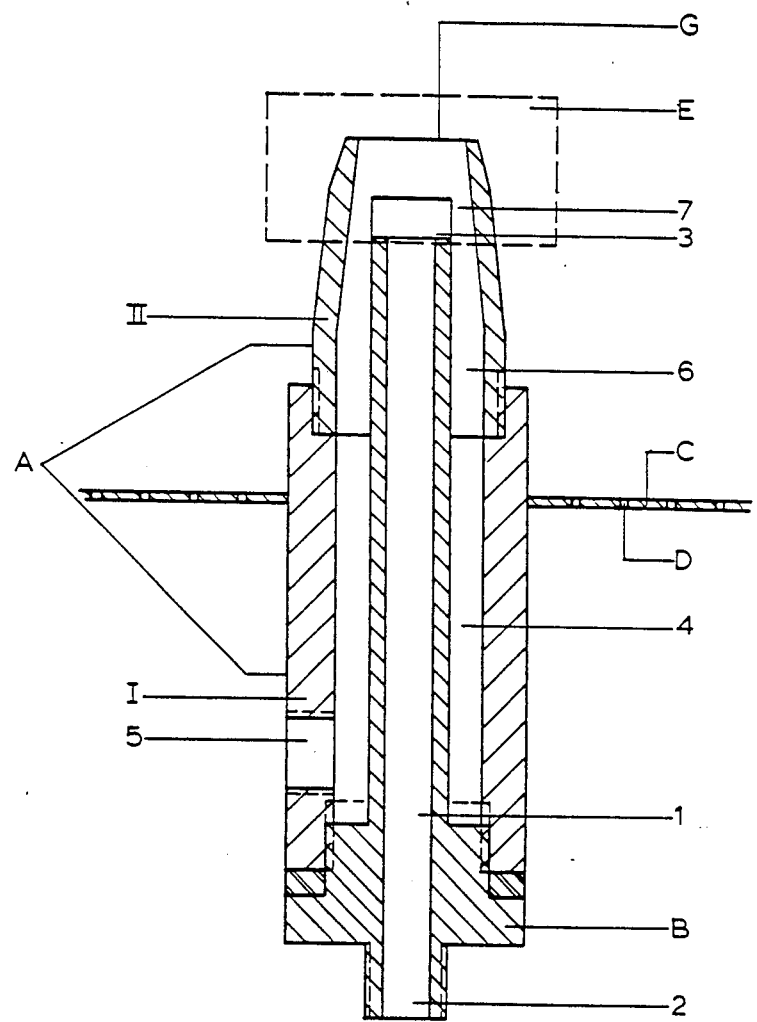
FIG. 1 represents a longitudinal section of the spraying device with which the process according to the invention can be conducted.

In FIG. 1, the spraying device is given the general designation A. It is composed of a feeding section I and a spraying section II. The spraying device is mounted in the granulation installation (omitted from the drawing) with bottom part B and fitted in the bottom plate C, which has been provided with perforations (D) for admitting fluidization air, and discharges via outlet opening G.

The spraying device is composed of a central channel 1, which at one end connects with a liquid line omitted from the drawing and at the other end leads into a rotation chamber 3. Further, the spraying device is provided with a channel 4 which has been fitted concentrically around the central channel, channel 4 being at one end via opening 5 connected to a gas line omitted from the drawing and at the other end provided with a narrowing part 6, which terminates into outlet opening 7. The outlet section E surrounded by the dotted rectangle in the Figures is represented in detail in FIG. 2.

Figures 2, 2A:
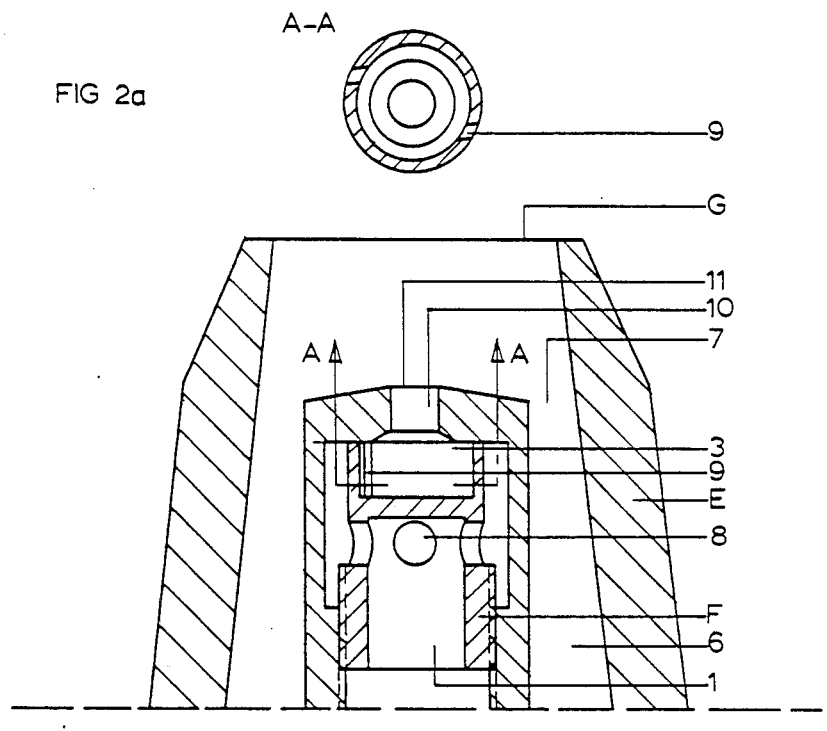
FIG. 2 represents a longitudinal section of the outlet part of such spraying device, FIG. 2A representing schematically, a cross section of the rotation chamber in such a sprayer, viewed from the top.

In FIG. 2, the outlet part of the spraying device is given the general designation E and is composed of a liquid-outlet around which a narrowing gas channel 6 provided with outlet opening 7 has been fitted. The liquid outlet F is composed of a liquid feeding channel 1, which via openings 8 and feed slots 9 connects with a rotation chamber 3, which has been provided with a central outlet channel 10 with outlet opening 11.

In FIG. 2A a schematic cross section along line A—A of the rotation chamber 3 of FIG. 2 is indicated. The feed slots are indicated by 9.

In FIG. 3 a modified outlet section of the spraying device is represented. It differs from the embodiment according to FIG. 2 in that around the concentric gas channel 6 a second concentric gas channel 12 has been provided, which terminates into outlet opening 13.

EXAMPLE I

To a circular fluidized-bed granulator with a diameter of 29 cm and having a perforated bottom plate (diameter of the holes 2 mm), which granulator contained a bed of urea particles with a height of about 80 cm, a 95 wt.% urea solution containing 0.6 wt.% formaldehyde, with a temperature of about 140° C. and under a feed pressure of 6 bar, was continuously supplied at a rate of 200 kg/h, from the bottom of the bed upwards.

The solution was supplied via the central channel 1 of a spraying device as represented in FIGS. 1 and 2. In addition, via a gas channel of this spraying device provided concentrically around this central channel 4, a powerful air stream was supplied with a temperature of about 140° C., under a feed pressure of 1.50 bar and at a rate of 89 kg/h. The spraying device had been fitted in the perforated bottom plate C in such a way that the vertical distance from the outlet opening C of the spraying device to the bottom plate C was about 4 cm.

The most important dimensions of the spraying device were as follows:
Diameter of central liquid channel (1): 12 mm
Width of concentric gas channel (4): 10 mm
Diameter of outlet opening of central channel (10): 3.0 mm
Width of annular outlet opening (7) of concentric channel: 2.65 mm
Angle of convergence of the concentric channel: 6°
Diameter of tangential slots (2x) in the rotation chamber (9): 1.5 mm The liquid came out of the central channel as a rippled, closed, conical film with a vertex angle of 89°, a film thickness of about 220 μm and a velocity of 29.6 m/sec. The film had a fairly high internal turburlence (We$\delta$ approx. 3400). The powerful air stream came out of the concentric channel with a velocity of 275 m/sec. and hit the film at an angle of about 51° C. at a distance of about 10 mm from the outlet opening (10) of the central channel. The film thickness at the moment of impact was about 60 μm, while the thurst ratio of fim to air was about 12:1. Upon impact, the film was virtually instantaneously nebulized in the air stream.

To the bed of urea particles, which had a temperature of about 100° C. and was kept fluidized with the aid of an upward air stream with a temperature of about 60° C. and a superficial velocity of 2.0 m/sec., also about 180 kg/h of solid urea particles with an average diameter of 1-1.5 mm and a temperature of about 39° C. was supplied, the particles having been obtained in screening and crushing of the granulate from the bed.

Via an overflow, granules (temperature approx. 100° C.) were continuously discharged from the bed to a drum cooler, where they were cooled to about 43° C. countercurrent with an air stream of ambient temperature. The cooled granules were subsequently led to a screening section provided with flat Engelman sieves of aperture size 2 and 4 mm. The fine fraction obtained here (about 165 kg/h) was returned to the bed, while the coarse fraction obtained (about 15 kg/h) was crushed to a $\delta_{50}$ of 1.1 mm with a roller crusher. The fine dust, with a particle size below 750 μm, was separated out with a wind sifter, after which the residual crushed material was returned to the bed.

As product screening fraction (2-4 mm) about 180 kg of granules were obtained per hour, which had the following properties:
bulk density: 720 kg/m$^3$
Crushing strength: 40 bar
H$_2$O content: 0.2 wt.%
Formaldehyde content: 0.6 wt.%
Impact resistance: 100%
Rolling capacity: 80% round The crushing strength was measured by placing an granule between two plates and exerting a gradually increasing pressure on the top plate, until such a pressure was reached that the granule broke. The roundness was determined by bringing the granules on a rotating disc mounted at an angle of 7.5° and measuring the percentage of granules sliding downward. The impact resistance was determined by shooting pellets against a plate mounted at an angle of 45° and measuring the roundness percentage before as well as after the treatment.

The fluidization air (100° C.) which came from the fluidized bed and which contained urea dust was washed in a wet washer, yielding a urea solution of about 40 wt.%, which was added to the urea solution supplied to the bed. The air coming from the drum cooler (60° C.) and the dust-containing air obtained in the windsifting process were passed through a bag filter. The urea dust so obtained was molten and added to the urea solution supplied to the bed.

EXAMPLE II

In the same manner as in Example I a urea solution was supplied to a fluidized bed of urea particles, but a spraying device as represented in FIG. 3 was used, which spraying device had been provided with two concentrically applied gas-supply channels. Through the inner concentric gas channel (width of annular outlet 1.9 mm), air was supplied at a rate of 67 kg/h and with a temperature of 140° C., a feed pressure of 1.45 bar and a velocity at the outlet of 275 m/sec. Through the outer concentric gas channel (width of annular outlet 3.5 mm; angle of convergence 6°), air was supplied at a rate of 90 kg/h and with a temperature of 120° C., a feed pressure of 1.1 bar and a velocity at the outlet of 125 m/sec. The other process conditions were the same as in Example I.

The results obtained virtually equalled those of Example I.

EXAMPLE III

In the same manner as in Example I, a 99 wt.% urea solution containing 0.4 wt.% formaldehyde and having a temperature of 140° C. was under a feed pressure of 5 bar and at a rate of 200 kg/h supplied to a circular fluidized-bed granulator (diameter 44 cm) with the aid of a spraying device as described in Example I. In addition, via the spraying device air of 140° C. was supplied at a rate of 78 kg/h under a feed pressure of 1.45 bar, via a concentric gas channel whose annular outlet was 2.3 mm wide and which converged at the outlet end at an angle of 10°.

The liquid came out of the central channel as a rippled conical film (Weδ about 3000) with a vertex angle of 87°, a film thickness of 240 μm and a velocity of 27 m/sec., while the air stream came out with a velocity of 260 m/sec. The angle of impact between film and air was 56.5°.

The other conditions during (and after) granulation were virtually the same as those described in Example I.

The product granules (2-4 mm) obtained after cooling and screening had the following properties:
Bulk density: 750 kg/m$^3$
Crushing strength: 80 bar
H$_2$O content: 0.05 wt %
Formaldehyde content: 0.4 wt %
Impact resistance: 100%
Rolling capacity: 85% round

EXAMPLE IV

In the same way as in Example I, an ammonium nitrate solution (200 kg/h) and a powerful air stream (87 kg/h) were continuously supplied to a circular fluidized-bed granulator (diameter 45 cm) which contained a bed of ammonium nitrate particles with a height of 70 cm, which bed (temperature 128° C.) was kept fluidized with an upward air stream with a superficial velocity of 2.1 m/sec. and a temperature of 140° C., use being made of a spraying device as described in Example I, while also solid ammonium nitrate particles obtained in screening and crushing of the granulate discharged from the bed were added, at a rate of about 195 kg/h.

The supplied ammonium nitrate solution contained 4.9 wt.% H$_2$O and 0.3 wt.% Ca(NO$_3$)$_2$ (calculated as CaO), and was supplied with a temperature of 147° C., under a feed pressure of 8 bar, coming out as a rippled conical film (vertex angle 88°; film thickness 190 μm; velocity 32 m/sec.; Weδ about 3900).

The powerful air stream was supplied with a temperature of 150° C. under a feed pressure of 1.6 bar and came out of the spraying device with a velocity of about 300 m/sec.

The granulate discharged from the bed (temperature approx. 128° C.) was screened while hot, the screening fraction with a particle size of more than 4 mm being crushed and returned to the bed together with the screening fraction with a particle size of less than 2 mm.

The product fraction (2-4 mm) was quickly cooled to about 55° C. with a fluidized-bed cooler. The granules obtained had the following properties:
Nitrogen content: 34.3 wt.%
H$_2$O content: 0.06 wt.%
Bulk density: 955 kg/m$^3$
Rolling capacity: 95% round
Impact resistance: 100%
Crushing strength: 35 bar
Oil absorbing capacity: 0.48 wt.%

EXAMPLE V

In the same manner as in Example IV, an ammonium nitrate solution was granulated in a circular fluidized-bed granulator with a diameter of 45 cm, the bed temperature being 138° C.

The supplied ammonium nitrate solution contained 5.2 wt.% H$_2$O, 0.5 wt.% CaCO$_3$ and 2 wt.% of a clay. As clay, a product was used which is available from the Tennessee Mining and Chemical Corporation under the name of Sorbolite, with a particle size below 5 μm, consisting mainly of SiO$_2$ (73 wt.%) and Al$_2$O$_3$ (14 wt.%). The ammonium nitrate solution was supplied at a rate of 150 kg/h with a temperature of 145° C. and under a feed pressure of 7 bar, via a spraying device as described in Example I except that it had a liquid outlet opening with a diameter of 2 mm. The liquid came out as a conical film with a vertex angle of 91°, a velocity of 30 m/sec., a film thickness of 190 μm and a Weber number of about 3300.

The powerful air stream (temperature 147° C.) fed via the spraying device was supplied under a pressure of 1.6 bar at a rate of 60 kg/h and came out of the spraying device with a velocity of 300 m/sec.

In addition, solid ammonium nitrate particles (temperature about 135° C.) obtained from the screening and crushing section were supplied to the bed at a rate of about 148 kg/h.

The granulate discharged from the bed was screened while hot, and the product fraction thus obtained (2-4 mm) was cooled to about 35° C. with a drum cooler. A portion of this product was five times heated and cooled between 15° and 50° C. The properties of the product obtained and of product subjected to five heating-and-cooling cycles were as follows:

|  | Product | Product after 5 cycles |
| --- | --- | --- |
| Nitrogen content | 33.85% | 33.85% |
| H$_2$O content | 0.09 wt. % | 0.08 wt. % |
| Bulk density | 946 kg/m$^3$ | 946 kg/m$^3$ |
| Rolling capacity | 75% round | 75% round |
| Impact resistance | 100% | 100% |
| Crushing strength | 40 bar | 40 bar |
| Oil absorbing capacity | 0.20 wt. % | 0.30 wt. % |

EXAMPLE VI

In the same manner as in Example I, a urea solution and solid urea particles were continuously supplied to a rectangular fluidized-bed granulator with a length of 2 m and a width of 1 m, which had been provided with a perforated bottom plate in which 30 spraying devices of the type described in Example I had been fitted. The total amount of urea solution supplied was about 6 tons/h, while also urea particles were supplied at a rate of 5.5 tons/h. The bed, whose bottom plate was mounted at an angle of about 3°, was at its lowest point provided with a discharge in the form of a vertical pipe with a control valve.

The other process conditions were virtually the same as those of Example I. The total amount of spraying air was about 2600 kg/h and about 86 kg per hour per spraying device.

As the product fraction (2-4 mm) in screening of granulate that had been discharged from the bed and cooled, about 5.5 tons of urea granules were obtained per hour, which had virtually the same properties as those described in Example I.

What we claim is:

1. A process for the preparation of solid granules from a liquid material which process comprises the steps of:
(1) forming and maintaining, in a vessel and above a feeding device therein, a fluidized bed of solid particulate nuclei by upwardly flowing a first relatively low velocity fluidizing gas stream through said bed, said feeding device comprising:
   (a) a first central conduit for delivering an upward flow of starting liquid material into the vessel from the exit of said first conduit in the form of an initially virtually closed conical film, with a vertex angle of 50°–110°, and with an internal turbulence such that the Weber number, expressed as:

$$We\delta = \rho_1(U_1)^2\delta/\sigma_1,$$

is greater than 2000, and
where:
$\rho_1$ = the density of the liquid material, in kg/m$^3$,
$U_1$ = the potential velocity of the liquid material, in m/sec.,
$\sigma_1$ = the surface tension of the liquid material, in N/m,
$\delta$ = the film thickness upon exit from the central channel, in m,
  (b) said first central conduit also having means for imparting a horizontal velocity component to said starting liquid prior to its exit, and
  (c) a second concentric conduit annularly disposed about said first conduit for delivering an upward flow of a second gas stream into the vessel from the exit thereof,
(2) introducing said starting liquid through said first central conduit to form said vertually closed conical film with said vertex angle and said Weber number, with a thrust exceeding the thrust of said second gas stream and having a horizontal velocity component,
(3) introducing, through said concentric annular conduit said second gas stream in a predominantly vertical direction so that the second gas stream is made to hit the conical film at an angle of 30°–80° and at an initially higher velocity, relative to the velocity of said first gas stream, which second gas velocity is such that the ratio:

$$\rho_{gas}[U_{gas}]^2/\sigma_1$$

where:
$\rho_{gas}$ = the density of the gas, in kg/m$^3$
$U_{gas}$ = the potential velocity of the gas, in m/sec., and
$\sigma_1$ = the surface tension of the liquid material, in N/m, is from $5\times10^5$ to $50\times10^5$ m$^{-1}$,
thereby forming a dilute zone of solid nuclei above the exit of said feeding device, whereby
  (a) said second gas stream impacts said virtually closed conical film to nebulize the same into very fine liquid droplets, to form a droplet loaded gas stream,
  (b) said droplet loaded gas stream aspirates a portion of the nuclei from said fluidized bed into said dilute zone,
  (c) said aspirated solid particulate nuclei thus contact said very fine liquid droplets to moisten said nuclei, and
  (d) allowing the liquid material thereby taken up by the nuclei to soldify thereon causing the solid nuclei to grow in size, and
(4) thereafter removing the thus-obtained granules from said vessel.

2. A process according to claim 1, wherein the liquid material is supplied under a pressure of 2 to 11 bar and is given a rotation in the feeding device.

3. A process according to claim 1, wherein said second gas stream with a velocity of 200 to 350 m/sec. is used.

4. A process according to claim 1, wherein a mass ratio of said second gas stream to liquid material of between 0.25:1 and 0.45:1 is used.

5. A process according to claim 1, wherein via a channel concentric with said second concentric conduit carrying the second gas stream an extra gas is supplied with a velocity lower than that of the second gas stream but higher than the free-fall velocity of the nuclei.

6. A process according to claim 1, wherein the potential velocity of the liquid material is 20 to 50 m/sec.

7. A process according to claim 1, wherein a liquid material and a second gas are used with thrusts $\rho V^2$ such that $$(\rho_1 V_1^2/\rho_{gas}V^2_{gas})$$

is 8:1 to 16:1, $\rho$ being the density in kg/m$^3$ and V the outlet velocity in m/sec.

* * * * *

UNITED STATES PATENT AND TRADEMARK OFFICE
CERTIFICATE OF CORRECTION

PATENT NO. : 4,701,353
DATED : October 20, 1987
INVENTOR(S) : MUTSERS, Stanislaus M.P. and CRAENEN, Gerardus S.P.M.

It is certified that error appears in the above-identified patent and that said Letters Patent is hereby corrected as shown below:

On the title page

Item [73] Assignee, Change "Unie van Kunstmestfabrieken B.V." to --Stamicarbon B.V., Geleen, The Netherlands--.

Signed and Sealed this

Twenty-ninth Day of March, 1988

Attest:

DONALD J. QUIGG

Attesting Officer      Commissioner of Patents and Trademarks